US008830987B2

(12) United States Patent
Vilis et al.

(10) Patent No.: US 8,830,987 B2
(45) Date of Patent: Sep. 9, 2014

(54) IP-BASED CALL ANSWERING POINT SELECTION AND ROUTING

(75) Inventors: Raymond A. Vilis, Ottawa (CA); Richard A. Peters, Grapevine, TX (US)

(73) Assignees: Solacom Technologies Inc., Gatineau (CA); Bandwidth.com, Inc., Cary, NC (US)

( * ) Notice: Subject to any disclaimer, the term of this patent is extended or adjusted under 35 U.S.C. 154(b) by 834 days.

(21) Appl. No.: 12/134,355

(22) Filed: Jun. 6, 2008

(65) Prior Publication Data

US 2008/0304631 A1 Dec. 11, 2008

Related U.S. Application Data

(60) Provisional application No. 60/942,498, filed on Jun. 7, 2007.

(51) Int. Cl.
*H04L 12/28* (2006.01)
*H04W 24/00* (2009.01)
*H04M 11/04* (2006.01)
*H04M 1/56* (2006.01)
*H04L 29/06* (2006.01)
*H04M 3/42* (2006.01)

(52) U.S. Cl.
CPC ....... *H04L 65/1069* (2013.01); *H04M 2242/04* (2013.01); *H04M 2242/14* (2013.01); *H04L 65/1096* (2013.01); *H04M 3/42* (2013.01)
USPC ... 370/351; 370/392; 370/395.32; 455/404.2; 455/456.1; 455/457; 379/45; 379/142.1

(58) Field of Classification Search
CPC ... H04L 29/08657; H04L 45/00; H04W 4/22; H04W 4/025; H04M 1/571; H04M 1/575; H04M 1/72536; H04M 3/5116
USPC ............ 370/236, 270, 351, 392, 395.32; 379/45, 142.1, 142.11, 142.02, 142.09; 455/414.2, 404.1, 404.2, 456.1, 456.5, 455/457
See application file for complete search history.

(56) References Cited

U.S. PATENT DOCUMENTS

| 7,031,714 | B1 * | 4/2006 | Rayburn ........................ 455/445 |
| 7,366,157 | B1 * | 4/2008 | Valentine et al. ............. 370/352 |
| 8,040,862 | B1 * | 10/2011 | Rosenberg et al. ........... 370/338 |
| 2005/0090225 | A1 * | 4/2005 | Muehleisen et al. ........ 455/404.1 |
| 2006/0176847 | A1 * | 8/2006 | Chen et al. .................... 370/328 |
| 2006/0222151 | A1 * | 10/2006 | Goldman et al. ............... 379/45 |
| 2006/0227959 | A1 * | 10/2006 | Mitchell ................... 379/221.13 |
| 2006/0233317 | A1 * | 10/2006 | Coster et al. .................... 379/45 |
| 2007/0003024 | A1 * | 1/2007 | Olivier et al. ................... 379/45 |

(Continued)

*Primary Examiner* — Un C Cho
*Assistant Examiner* — Jeremy Costin
(74) *Attorney, Agent, or Firm* — Stevens & Showalter, LLP

(57) ABSTRACT

An apparatus and a method for IP-based call answering point selection and routing. When an IP-based call is placed to an answering point such as, for example, a Public Safety Answering Point a location for the caller can not be determined using traditional DNIS and ANI based techniques. In the present invention, a geographic location (geolocation) for the caller is determined, from as IP address associated with the caller, using a database. The database comprises information obtained from a plurality of IP location sources (e.g. Skyhook Wireless Inc.'s Loki™, Federal Communications Commission (FCC) mandated WiFi™ hotspot registration data). An answering point is selected from a plurality of answering points as a function of the caller's location. The call is routed to the selected answering point and the caller's location information is provided to that answering point.

16 Claims, 2 Drawing Sheets

(56) References Cited

U.S. PATENT DOCUMENTS

| | | |
|---|---|---|
| 2007/0041513 A1* | 2/2007 | Gende .............................. 379/37 |
| 2007/0115935 A1* | 5/2007 | Qiu et al. ...................... 370/352 |
| 2007/0153986 A1* | 7/2007 | Bloebaum et al. .............. 379/45 |
| 2008/0260110 A1* | 10/2008 | Chotai et al. .................... 379/45 |
| 2008/0261557 A1* | 10/2008 | Sim ............................ 455/404.2 |

* cited by examiner

IP-BASED CALL ANSWERING POINT SELECTION AND ROUTING

CROSS-REFERENCE TO RELATED APPLICATIONS

This application claims priority from U.S. provisional patent application Ser. No. 60/942,498, filed Jun. 7, 2007, the entirety of which is incorporated herein by reference.

FIELD OF INVENTION

The present invention relates to the field of routing Internet protocol (IP) based telephony calls to public safety answering points and other similar answering points. In particular, to an apparatus and a method for IP-based call answering point selection and routing.

BACKGROUND

Typically calls from wireline telephony callers to Public Safety Answering Points (PSAP) (e.g. Enhanced 9-1-1 (E911) and United States Department of Transport Next Generation 9-1-1 (NG9-1-1)) and other similar answering points are routed to a correct answering point based on a location of the caller derived from the Dialed Number Identification Service (DNIS) (e.g. 9-1-1 in the case of emergency) and Automated Number Identification (ANI) of the caller. The answering point is provided with location information for the caller based on the physical location of the wireline service that the call originated from, based on the ANI number and associated address information. Cellular (a.k.a. mobile) telephony calls to an answering point are also typically routed based on DNIS/ANI, but methods to physically locate the caller based on geographic location through the use of GPS, triangulation and serving tower location are used in providing the answering point with location information for the caller.

With the advent of Voice over Internet Protocol (VoIP) and Voice over Instant Messaging (VoIM) calls (comprising a voice and/or an Instant Messaging (IM) component), a caller may not have an associated ANI and the physical location of the caller cannot be derived from any physical connection to the caller or by means of Wireline Registration, GPS, triangulation or cellular tower location. When a call from a cellular (a.k.a. mobile) terminal utilizes IP connectivity to originate a VoIP/VoIM call, or when the cellular terminal is a dual-mode appliance (e.g. WiFi/WiMax capable) and uses the non-cellular capability to originate a call, current cellular techniques to determine the location of the cellular terminal will not be triggered and/or are not able to determine the correct location.

Given that the answering point to which a call is routed is selected as a function of the location of the caller, a growing proportion of PSAP and other answering point calls (e.g. VoIP and VoIM calls) fail to be routed correctly utilizing current known processes and systems because the caller's location can not be reliably determined.

What is needed is an apparatus and method for IP-based call answering point selection and routing.

SUMMARY OF THE INVENTION

An apparatus and a method for IP-based call answering point selection and routing. When an IP-based call is placed to an answering point such as, for example, a Public Safety Answering Point a location for the caller can not be determined using traditional DNIS and ANI based techniques. In the present invention, a geographic location (geolocation) for the caller is determined, from as IP address associated with the caller, using a database. The database comprises information obtained from a plurality of IP location sources (e.g. Skyhook Wireless Inc.'s Loki™, Federal Communications Commission (FCC) mandated WiFi™ hotspot registration data). An answering point is selected from a plurality of answering points as a function of the caller's location. The call is routed to the selected answering point and the caller's location information is provided to that answering point.

In one aspect of the present invention there is provided an apparatus for Internet Protocol (IP)-based call answering point selection and routing, for connecting a call from a calling device over an IP-based medium to an answering point selected from a plurality of answering points, comprising: a location database for collection and storing location information associated with a plurality of IP addresses and a plurality of identifier tags; a rules repository for storing and retrieving of rules including rules for: for identifying clusters and prioritizing the handling of a call responsive to call clusters; a kernel for: receiving a call origination request from the calling device; determining an IP address for the calling device; determining an caller location for the calling device by looking-up the IP address in a location database; designating an answering point from the plurality of answering points to which the call is to be routed responsive to the caller location; and connecting the call to the designated answering point.

In one aspect of the present invention there is provided a method for Internet Protocol (IP)-based call answering point selection and routing, for connecting a call from a calling device over an IP-based medium to an answering point selected from a plurality of answering points, comprising the steps of: receiving a call origination request from the calling device; determining an IP address for the calling device; determining an caller location for the calling device by looking-up the IP address in a location database; designating an answering point from the plurality of answering points to which the call is to be routed responsive to the caller location; and connecting the call to the designated answering point.

BRIEF DESCRIPTION OF DRAWINGS

The present invention will be described in conjunction with drawings in which.

DISCLOSURE OF INVENTION

Figure 1:
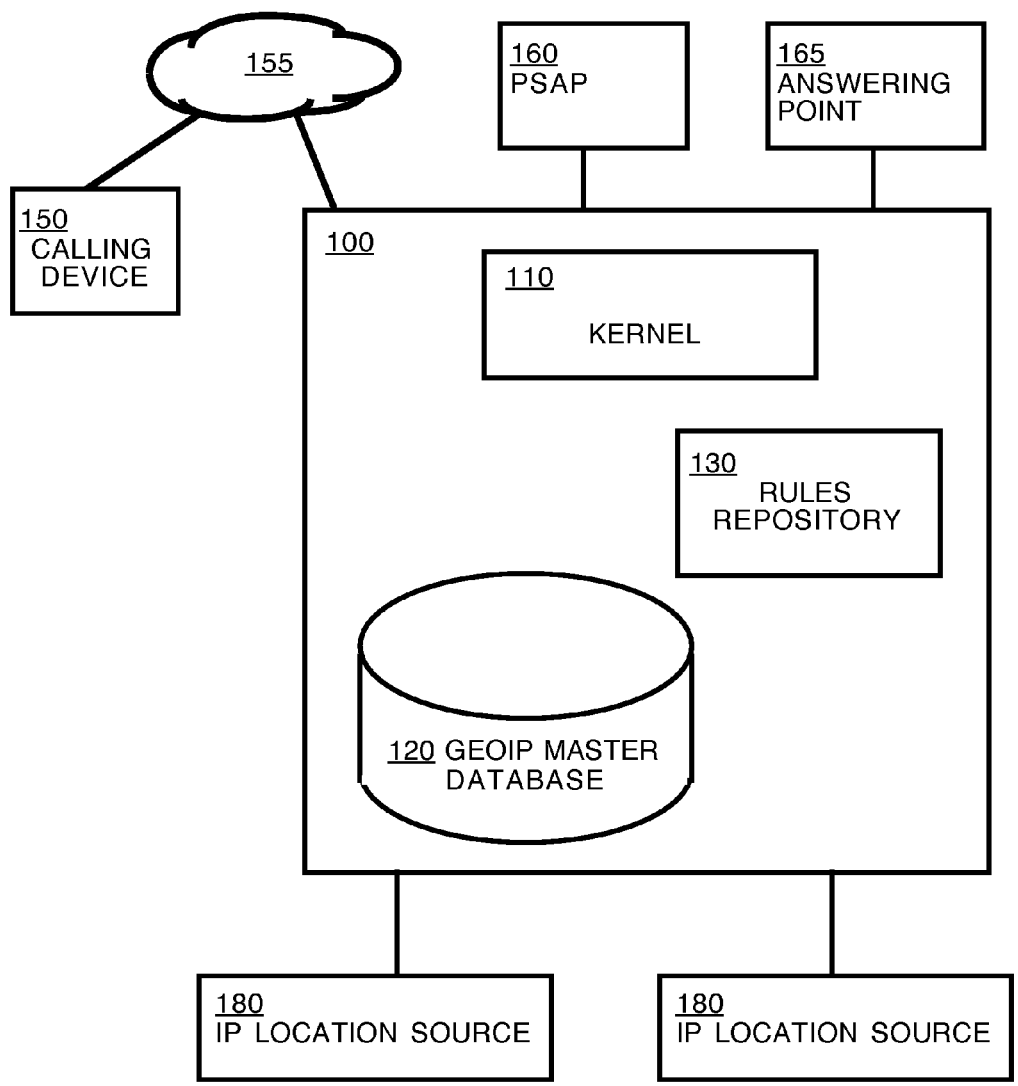
FIG. 1 is a schematic representation of an exemplary embodiment of an apparatus for IP-based call answering point selection and routing.

FIG. 1 is a schematic representation of an exemplary embodiment of an apparatus 100 for IP-based call answering point selection and routing. The apparatus 100 provides for a call from a call device 150 through an Internet Protocol (IP) based medium 155 to be routed to a PSAP 160 (e.g. E911) or other similar answering point 165 based on the location of the caller (i.e. of the calling device 150). The answering points 160, 165 can be call centers or can be individual positions within one or more call centers. The call device 150 can be, for example, a personal computer, WiFi™ enabled computing device, data-capable mobile phone, or other similar devices capable of telephony over an IP-based medium.

The apparatus 100 comprises: a kernel 110, a GeoIP master database 120 and a repository of rules 130. The kernel 110 provides for functions including: receiving a call origination request from the calling device 150; determining the IP address of the caller (i.e. of the calling device 150); determining and verifying the caller's location; collecting and correlating of identity (i.e. identifier) data; answering point 160, 165 selection and routing of the call to the selected answering point 160, 165; and providing caller location information to the answering point 160, 165. The GeoIP master database 120 provides for the collection, storage and retrieval of information related to: various types of identifiers of IP-based callers and location information associated with the identifiers. The IP-based caller identifiers can, for example, include Directory Numbers (DN), Instant Messaging (IM) identity tags, Short Message Service (SMS) addresses, and Telephone Numbering Mapping (ENUM) identifiers. The location information can, for example, include any one or more of a latitude/longitude/elevation coordinate set, municipal address, postal code, a residential/enterprise indicator, a last known location, a distance between a current and last know location. The database 120 also provides for requesting and/or accessing location information from one or more IP location sources 180 (e.g. Skyhook Wireless Inc.'s Loki™, Federal Communications Commission (FCC) mandated WiFi™ hotspot registration data). In an alternative embodiment, the kernel 110 can further provide for functions including: determining a range of IP addresses based on a location/area; and tracking and managing call clusters. The rules repository 130 stores and provides for the retrieval of rules including rules for: for identifying clusters and prioritizing the handling of a call responsive to call clusters.

The apparatus 100 can execute the call routing regardless of whether or not an ANI is associated with the caller. When an ANI identifier is available the apparatus 100 can cross check the location information in the GeoIP master database 120 for that ANI against the location derived from the IP address. The location information can, for example, be in National Emergency Number Association (NENA) Automatic Location Identification (ALI) format. When the locations derived from the IP address and from the ANI match, the apparatus 100 makes the information available to the answering point. When the location information does not match, the apparatus 100 can route the call to an answering point based on the IP address location and inform the answering point of the conflicting location information. The apparatus 100 can remain connected to the call so that the answering point can request a transfer of the call to another answering point corresponding to the location associated with the ANI, or to another specified answering point. Alternatively, when the location information does not match, the apparatus 100 can prompt the caller to identify their correct location. The prompt can be in the form of an audio prompt that plays a set of location selections (e.g. the locations associated with the IP address and the ANI respectively) to the caller and prompts the caller to select their actual location using a voice or alternatively a dual tone multi-frequency (DTMF) key press response. In an alternative embodiment, the prompt for a location selection can be in the form of a video clip.

When the caller is utilizing VoIM or another service having a non-Directory Number based identity tag (e.g. AOL® Buddy, Skype™ Name, MSN® Contact), the apparatus 100 determines the caller's location based on IP information, and also uses the call's identity tag to find any additional location information available through the GeoIP master database 120. When a location mismatch is determined between the location associated with the identity tag and the IP address derived location, the apparatus 100 can process the call using either of the approaches described above with regard to a location mismatch. In an alternative embodiment, the apparatus 100 can also use other identity tags to associate the caller with location data that is provided periodically by an embedded client application on the calling device 150.

A call origination request received from the call device 150 by the apparatus 100 is associated with a voice call destined for an answering point. In addition to the voice call, the call origination request can further include a request for a data connection to be used for, for example, messaging, telemetry, video. When the apparatus 100 routes the call to the selected answering point, the call supports the voice call and other connects requested by the caller.

The apparatus 100 also can be used to track and manage call clusters. Call clusters are a group of calls originating from a common geographic area, or from a specified set of IP addresses, or specified set of identity tags. The apparatus 100 can track the geographic positional relationship of calls received by the apparatus 100 to identify clusters of calls occurring or forming, track the presence of a call cluster from a specified geographic area (i.e. via ZIP codes, GPS co-ordinates, etc), and track the presence of a call cluster from a specified set of IP addresses.

When a call cluster is identified, the apparatus 100 can be configured to prioritize calls to specific answering points originating outside the cluster over calls originating within the cluster. The apparatus 100 is capable of intelligent call prioritization and can mitigate an answering point being overwhelmed by, for example, a single event when the same event is being reported by multiple callers.

The apparatus 100 can be alternatively configured to drop new calls originating from clusters, or route calls from a cluster to a secondary answering point. The apparatus 100 can further be configured to prioritize calls from specific IP addresses, identity tags (e.g. an Emergency Response Plan (ERP) personnel VoIP call), or geographic locations (e.g. where a school is located).

In an alternative embodiment, the apparatus 100 can receive a request from an answering point 160, 165 containing a plurality of IP addresses, a range of IP addresses or combinations thereof. In response to the request the apparatus 100 determines, using the GeoIP master database 120, identities associated with each IP and connects the requesting answering point 160, 165 with a calling device 150 associated with each identity. Each identity can comprise, for example, a Directory Number, IM tag, and other similar forms of identity tagging.

Figure 2:
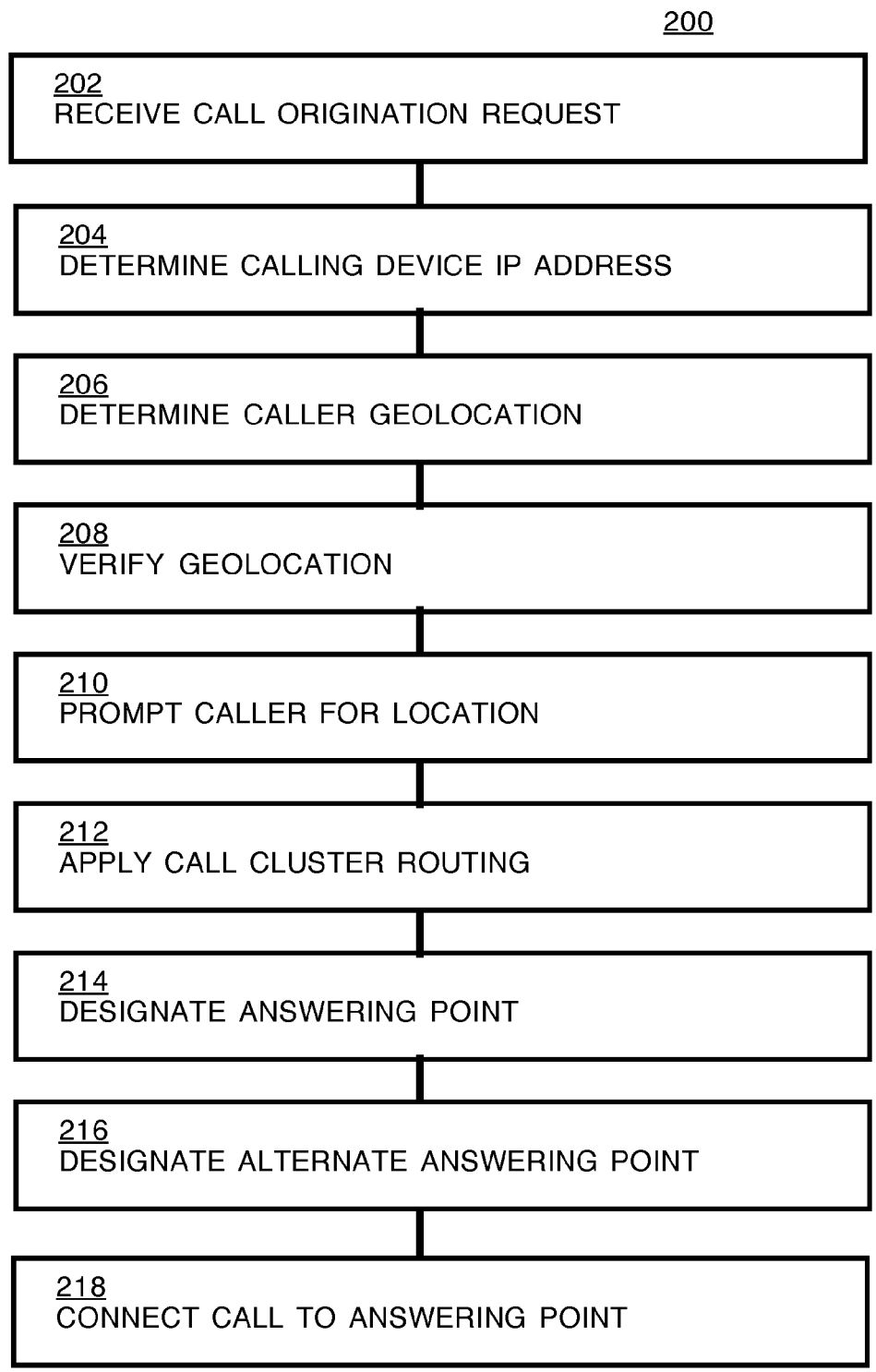
FIG. 2 is a flow diagram of the steps in an exemplary method for IP-based call answering point selection and routing.

FIG. 2 is a flow diagram of the steps in an exemplary method 200 for IP-based call answering point selection and routing. The method 200 can be implemented using the apparatus 100 described above with reference to FIG. 1. The method begins when a call origination request is received 202 from a call device 150 through an IP-based medium 155. The call origination request is for an IP-based call such as, for example, a VoIP or VoIM call. An IP address is determined 204 for the calling device 150 (hereinafter the caller). Determination of the IP address can, for example, be based on IP data contained in the call origination request or on Transmission Control Protocol/Internet Protocol (TCP/IP) information contained in underlying IP transport data packets. In step 206 determination of a geolocation for the caller is made. The geolocation is preferably in the form of a set of longitude, latitude and elevation coordinates. The geolocation can, for example, be compliant with National Emergency Number Association (NENA) technical standards: 08-001 NENEA Interim VoIP Architecture for Enhanced 9-1-1 Services (i2), Issue 1, Dec. 6, 2005; and 08-002 NENA Functional and Interface Standards for Next Generation 9-1-1 (i3), Version 1.0, Dec. 18, 2007. Determination of the geolocation can be made by looking up the IP address determined in step 204 in the GeoIP master database 120. Location information resulting from the IP address look-up in the GeoIP master database 120 can, optionally, be converted if required to a pre-determined format for the geolocation. In step 208 the geolocation can optionally be verified and a location accuracy indicator is generated. When an identity tag other than the IP address or Directory Number (DN) is available for the caller (e.g. an AOL® Buddy, a Skype™ Name, or a MSN® Contact), the identity tag is used to look-up an address in an IP location source 180. When the address resulting from the identity tag look-up does not match the geolocation determined in step 206, the location accuracy indicator is set to indicate a location mismatch. In step 210, when the location accuracy indicator indicates a mismatch, a prompt can optionally be provided to the caller to identify their correct location. The prompt can be in the form of an audio prompt that plays a set of location selections to the caller and prompts them to select their actual location using a voice or alternatively a dual tone multi-frequency (DTMF) key press. In an alternative embodiment, the prompt for a location selection can be in the form of a video clip. In step 212, call cluster routing can optionally be applied. When call cluster routing is being applied, the time and location of the call is recorded by the apparatus 100. The times and locations of other calls are also recorded. Based on the recorded times and locations, a determination can be made that call clustering is occurring. That is, that a large number of calls are being received from callers in proximate locations within a pre-determined span of time indicating that the calls may be related to a single common event. When the call is determined to be part of a call cluster, call cluster routing is applied. Call cluster routing can include any one of lowering the priority of call processing, dropping the call and designating that the caller be routed to an alternate answering point 160, 165. In step 214, an answering point 160, 165 is designated to which the call is to be routed. Designation of the answering point 160, 165 is a function of a pre-determined assignment of geographic locations to one of a plurality of answering point 160, 165. For example, all addresses in a county or a borough, or a range of municipal addresses can be assigned to one answering point 160, 165 (e.g. an E 9-1-1 call center). The assignment of locations to a plurality of answering point 160, 165 can be stored in the apparatus 100. The assignment of each location or group of locations to a answering point 160, 165 can be dynamically changed from time to time. In step 216, an alternative answering point 160, 165 can optionally be designated responsive to a load factor associated with the answering point 160, 165 designated in step 214. For example, when the answering point 160, 165 designated in step 214 is experiencing high call volumes, is back-logged with calls, or routing to an alternate answering point 160, 165 due to call clustering was designated in step 212, an alternative answering point 160, 165 is designated. In step 218, the caller is connected to the answering point 160, 165 designated in step 214 or, when an alternative answering point 160, 165 was designated in the step 216, to the alternative answering point 160, 165. The answering point 160, 165 is provided with the geolocation information determined for the caller. When the location accuracy indicator indicates a mismatch, the apparatus 100 remains connected to the call when the caller is connected with the answering point 160, 165. Should the answering point 160, 165 determine that the caller has been connected to an incorrect answering point 160, 165, the apparatus 100 can transfer the caller to an alternative answering point 160, 165.

The method 200 can be implemented using a computer program product comprising computer executable program instructions stored on a computer-readable storage medium.

It will be apparent to one skilled in the art that numerous modifications and departures from the specific embodiments described herein may be made without departing from the spirit and scope of the present invention.

The invention claimed is:

1. An apparatus for Internet Protocol (IP)-based call answering point selection and routing comprising:
   a geographic location database for collection and storing:
   geographic location information associated with a plurality of IP addresses; and
   geographic location information associated with a plurality of Instant Messaging identity tags identifying one or more geographic locations associated with communications made using the Instant Messaging identity tags;
   a rules repository for storing and retrieving of rules including rules for:
   identifying call clusters and prioritizing handling of calls responsive to the identified call clusters;
   a kernel for:
   receiving a call origination request for a call from a calling device; determining an IP address for the calling device;
   determining a geographic calling location for the calling device by looking-up the IP address in the geographic location database;
   determining an geographic identity location by looking-up an Instant Messaging identity tag of the plurality of Instant Messaging identity tags in the geographic location database, the Instant Messaging identity tag associated with a user of the calling device and used to uniquely identify the user in a communication service;
   verifying the geographic calling location using the geographic identity location;
   designating an answering point from a plurality of answering points to which the call is to be routed responsive to the verified geographic calling location; and
   connecting the call to the designated answering point.

2. The apparatus of claim 1, wherein each of the plurality of answering points is a Public Safety Answering Point.

3. The apparatus of claim 1, wherein the kernel is further for determining a location accuracy indicator based upon the geographic calling location associated with the IP address and the geographic identity location associated with the Instant Messaging identity tag.

4. The apparatus of claim 3, wherein the location accuracy indicator is provided to the designated answering point.

5. The apparatus of claim 3, wherein the location accuracy indicator is used in verifying the calling geographic location, and determining the location accuracy indicator further comprises:
   determining a location match when the calling geographic location and the identity geographic location are the same; and
   determining a location mismatch when the geographic calling location and the geographic identity location are not the same.

6. The apparatus of claim 5, the kernel further for, when there is a location mismatch when verifying the calling location:
   prompting the user for a correct geographic location by:
   prompting the user to select from the geographic calling location and the geographic identity location; and
   accepting a response from the user indicating the correct location.

7. The apparatus of claim 1, the kernel further for, after determining the geographic calling location:
  applying call cluster routing by:
    recording a time and the geographic calling location associated with the call; determining that the call originated from within one of the call clusters when the geographic calling location matches a location of a particular call cluster of the call clusters; and
    determining that the call originated outside of the call clusters when the geographic calling location does not match a location of any of the call clusters.

8. The apparatus of claim 7, the kernel further for, after designating the answering point:
  designating an alternate answering point when the call originated from within one of the call clusters.

9. A method for Internet Protocol (IP)-based call answering point selection and routing, comprising:
  receiving a call origination request for a call from a calling device;
  determining an IP address for the calling device;
  determining a geographic calling location for the calling device by looking-up the IP address in a geographic location database storing location information associated with a plurality of Instant Messaging identity tags identifying one or more geographic locations associated with communications made using the Instant Messaging identity tags;
  determining a geographic identity location by looking-up an Instant Messaging identity tag of the plurality of Instant Messaging identity tags in the geographic location database, the Instant Messaging identity tag associated with a user of the calling device and used to uniquely identify the user in a communication service;
  verifying the geographic calling location using the geographic identity location; designating an answering point from a plurality of answering points to which the call is to be routed responsive to the verified geographic calling location; and
  connecting the call to the designated answering point.

10. The method of claim 9, wherein each of the plurality of answering points is a Public Safety Answering Point.

11. The method of claim 9, further comprising determining a location accuracy indicator based upon the geographic calling location associated with the IP address and the geographic identity location associated with the Instant Messaging identity tag.

12. The method of claim 11, wherein the location accuracy indicator is provided to the designated answering point.

13. The method of claim 11, wherein determining the location accuracy indicator used in verifying the geographic calling location further comprises:
  determining a location match when the geographic calling location and the geographic identity location are the same; and
  determining a location mismatch when the geographic calling location and the geographic identity location are not the same.

14. The method of claim 13, wherein when there is a location mismatch, after verifying a geographic calling location, the method further comprising:
  prompting the user for a correct geographic location by:
    prompting the user to select from the geographic calling location and the geographic identity location; and
    accepting a response from the user indicating the correct location.

15. The method of claim 9, wherein after the determining the geographic calling location the method further comprising:
  applying call cluster routing by:
    recording a time and the geographic calling location associated with the call;
    determining that the call originated from within one of a plurality of call clusters when the geographic calling location matches a location of one of the plurality of call cluster; and
    determining that the call originated outside of the plurality of call clusters when the geographic calling location does not match a location of any of the plurality of call clusters.

16. The method of claim 15, wherein after designating the answering point the method further comprising:
  designating an alternate answering point when the call originated from within one of the plurality of call clusters.

* * * * *